UNITED STATES PATENT OFFICE.

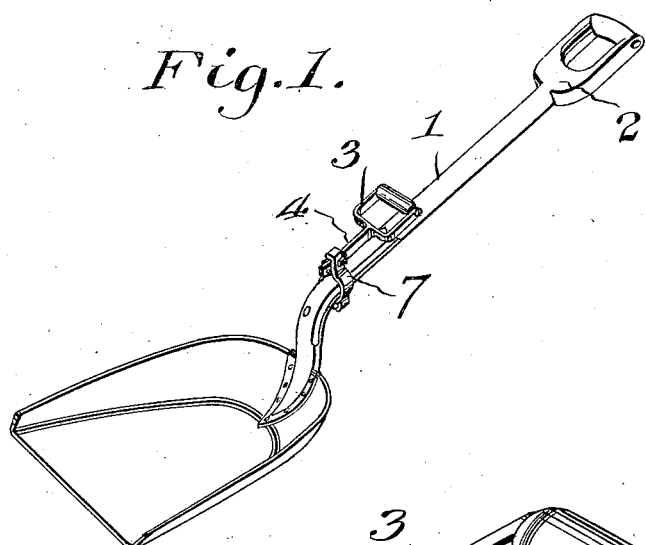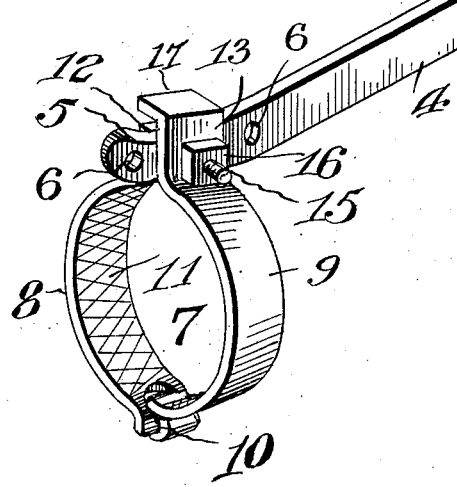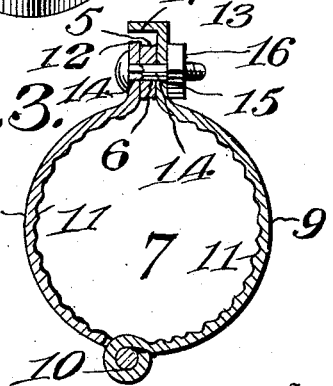

FREDERIC HUNT, OF OBERON, NORTH DAKOTA.

AUXILIARY HANDLE FOR SHOVELS, SCOOPS, &c.

933,647. Specification of Letters Patent. Patented Sept. 7, 1909.

Application filed April 17, 1909. Serial No. 490,543.

*To all whom it may concern:*

Be it known that I, FREDERIC HUNT, a citizen of the United States, residing at Oberon, in the county of Benson and State of North Dakota, have invented new and useful Improvements in Auxiliary Handles for Shovels, Scoops, &c., of which the following is a specification.

This invention relates to an auxiliary handle for shovels, scoops, hay and manure forks, and other like implements requiring the use of two hands in operating them.

The object of the invention is to provide an auxiliary handle which may be quickly and conveniently applied to any desired portion of the handle bar of the implement, which affords greater lifting power with less labor and fatigue and greater convenience in manipulating the implement, and which is adjustable to regulate its leverage or lifting action.

The invention consists of the features of construction, combination and arrangement of parts hereinafter fully described, illustrated and claimed, reference being had to the accompanying drawings, in which:—

Figure 1 is a perspective view of a shovel equipped with the auxiliary handle. Fig. 2 is a perspective view of the auxiliary handle detached. Fig. 3 is a transverse section through the shackle and shank of the handle.

Referring to the drawing, 1 designates the handle bar of a shovel, scoop, hay or manure fork or other like implements, which bar is provided at its rear end with the usual fixed handle 2. Implements of this kind are manipulated by both hands of the operator, one grasping the handle 2 and the other the bar 1 at a distance forward from said handle. Owing to the twisted position which must be assumed by the forward hand in grasping the handle bar, and to the fact that this hand is utilized to lift the load, while the operator is compelled to stoop to a greater or less degree in using the implement, it is well known that implements of this class cannot be operated for any material length of time without great labor, strain and fatigue. The purpose of my invention is to provide an auxiliary handle attachment which to a large extent overcomes this objection. The attachment comprises a handle 3 having a forwardly projecting shank 4 formed with an upward curved forward end 5 in which is a longitudinal series of holes 6, three of such holes being shown in the present instance. A cuff or shackle 7 is provided to embrace the handle bar 1 and consists of two semi-circular sections 8 and 9 pivotally connected at their lower ends, as indicated at 10, so that the shackle may be readily applied, removed and adjusted to a desired position on the handle bar. The inner faces of these shackle members are preferably roughened or serrated, as shown at 11, to cause the shackle to firmly grip the handle bar and prevent slipping of the same thereon. At their upper or free ends the shackle sections are provided with upstanding parallel ears 12 and 13 having registering transverse openings 14 to receive a pivot bolt 15 provided with a retaining nut 16. The curved forward end 5 of the shank 4 of the handle 3 extends forwardly between these ears and is pivotally mounted on the nut, which passes through one of the openings 6 therein. One of said ears is provided with a flange or projection 17 which projects over the shank portion 5 and the other ear and serves as a stop to limit the upward pivotal movement of the handle 3.

In use, the auxiliary handle is applied to the handle bar 1 at the point desired by the operator, who grasps both handles 2 and 3. As the handle 3 is arranged above the bar 1, it may be conveniently grasped and manipulated without the strain produced when the bar is directly grasped. As said handle 3 is also pivoted, convenience is afforded in lifting and throwing the load with less labor and strain upon the operator. This swinging movement may be increased or diminished by passing the bolt through one or the other of the holes 6 whereby the pivotal point of the handle is shifted, a material and important convenience. By this adjustment the distance between the two handles will be simultaneously and proportionately varied, thus enabling the auxiliary handle to be arranged to suit the reach of the operator. The stop 17 limits the pivotal movement of the auxiliary handle and prevents the same from dropping forward to an inoperative position.

From the foregoing description, the mode of application and use, as well as the advantages of the improved auxiliary handle will be apparent, and it will be seen that it may be mounted for use upon the handle bar of implements of the character described in a quick and convenient manner. Shackles of different sizes may be provided for applying the auxiliary handle to different sized handle bars.

Having thus described the invention what is claimed as new is:—

1. An auxiliary handle for shovels or like tools comprising a shackle, a handle having an adjustable pivotal connection with the shackle, and a stop in the shackle to limit the pivotal movement of the handle.

2. An auxiliary handle for shovels or like tools comprising a shackle, and a handle having a shank provided with an upwardly curved end adjustably pivoted to the shackle.

3. An auxiliary handle for shovels or like tools comprising a shackle, a handle having a shank provided with an upwardly curved forward end adjustably pivoted to the shackle, and a stop on the shackle adapted to be engaged by said shank to limit the pivotal movement of the handle.

4. An auxiliary handle for shovels or like tools comprising a shackle, a handle having a shank provided with an upwardly curved forward end formed with a series of openings, and a pin adapted to be passed through one of said openings and connected with the shackle to pivotally connect the handle thereto.

5. An auxiliary handle for shovels or like tools comprising a shackle, a handle having a shank provided with an upwardly curved forward end formed with a series of openings, a pin adapted to be passed through one of said openings and connected with the shackle to pivotally connect the handle thereto, and a stop on the shackle adapted to be engaged by said shank to limit the pivotal movement of the handle.

6. An auxiliary handle for shovels and like tools comprising a shackle formed of two pivoted members having ears, a bolt passing through said ears, and a handle provided with a shank having a curved forward end formed with a series of openings for pivotal connection with said bolt.

7. An auxiliary handle for shovels and like tools comprising a shackle formed of two pivoted members having ears, a bolt passing through said ears, a handle provided with a shank having a curved forward end formed with a series of openings for pivotal connection with said bolt, and a stop on one of said ears to limit the pivotal movement of the handle.

In testimony whereof I affix my signature in presence of two witnesses.

FRED. HUNT.

Witnesses:
T. T. CLOSE,
GUST DALQUIST.